Figure 1:
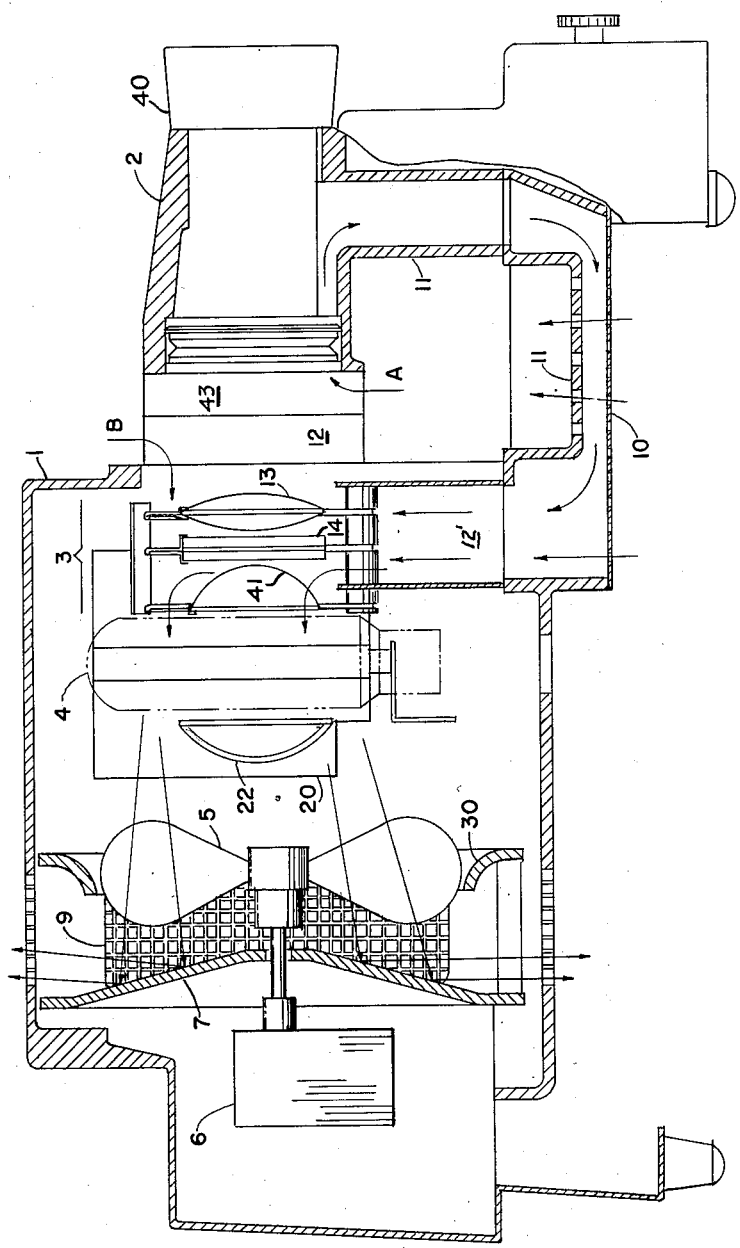

Jan. 29, 1957

D. POLLAN

2,779,236

FILM PROJECTOR COOLING MEANS

Filed March 8, 1955

2 Sheets-Sheet 1

INVENTOR.
DAVID POLLAN

INVENTOR.
DAVID POLLAN

United States Patent Office 2,779,236
Patented Jan. 29, 1957

2,779,236

FILM PROJECTOR COOLING MEANS

David Pollan, Jackson Heights, N. Y., assignor to Viewlex, Inc., Long Island City, N. Y., a corporation of New York Application March 8, 1955, Serial No. 492,870

6 Claims. (Cl. 88—24)

This invention relates to film projector cooling means, and, more particularly, to film projector designed for maximum cooling of the light source.

One of the most important problems in the design of film projectors, especially of the high wattage size, for instance, using 500 and 1000 watt projector lamps is the tremendous heat generated by these bulbs. This problem is so acute that forced air cooling is used in all cases, but even that does not solve the problem adequately.

Conventional projector lamps are generally fairly long, narrow cylinders and they must be fairly compact in order to provide a source of light of great intensity in a narrow beam. These lamps are generally constructed of heat resistant glass. However, there is so much heat generated in such a small space that even the lens must be of special heat resistant glass, and generally, also, heat filters must be provided to protect the lenses. The heat generated by these lamps is so great that their life is seriously affected. Due to specific space requirements for the fan and motor, it is generally not possible to cool the lamps sufficiently to obtain their rated life. What happens generally is that a design compromise is reached and the lamps are run very hot, with the result that their life is decreased, and that in many cases the lamp glass even melts or explodes as it approaches the rated life of the lamp.

In order to provide sufficient cooling, using known techniques, the fan and motor would have to be ridiculously large. There is also a noise factor to be considered, since a large fan and motor will create a tremendous amount of noise.

The projector lamp is a long, cylindrical object and in the presence of normal air currents, air bubbles form on the outside surface of the lamp, forming stagnant air pockets which insulate the outer surface of the lamp from the cooling air. By greatly increasing the velocity and turbulence of the cooling air, it is possible to wash these pockets off the surface of the cylindrical object, thereby removing the insulation of the air pockets and providing a much greater cooling effect. This turbulence is one of the important features of the present construction, since the greatly increased velocity of the air on all sides of the projector lamp creates a great deal of turbulence all around the lamp between the projector lamp, the reflector, and the lens immediately in front of the projector lamp, thereby removing the insulating air pockets.

The present invention provides a projector casing which is designed to facilitate the flow of air past the parts of the projector which should be protected, namely, the film, the lenses, and, most important, the projector lamp. The present projector casing includes a chimney through which air is drawn past the film and lenses, and also provides a longitudinal Venturi type construction adjacent the surface of the projector lamp so that the velocity of the air past the lamp is greatly accelerated, thereby providing a maximum velocity and turbulence of cooling air exactly where it is needed around the surface of the lamp. A fan and motor are located behind the lamp and a cone arrangement is provided behind the fan and between the fan and motor, which deflects the air out of the rear of the side of the projector. This cone has been found very advantageous, and as a matter of fact increases the feet per minute rating of the fan and motor considerably over the standard rating specified for this size motor.

Accordingly, a principal object of the invention is to provide new and improved film projector means.

Another object of the invention is to provide new and improved film projector cooling means.

Another object of the invention is to provide new and improved film projector means having cooling means adapted to cool the lenses and projector lamp.

Another object of the invention is to provide new and improved film projector means having cooling means adapted to cool the film, the lenses and projector lamp, comprising a chimney built in to the projector casing underneath the lamps and longitudinal Venturi vane means located adjacent the projector lamp.

Another object of the invention is to provide new and improved cooling means for film projectors of the type having a fan and motor, comprising a novel cone inserted behind the fan and adapted to deflect the air approximately 90°.

Another object of the invention is to provide new and improved means for cooling projector lamps, and thereby increasing their life.

Another object of the invention is to provide new and improved means for improving the efficiency of film projectors.

Figure 2:
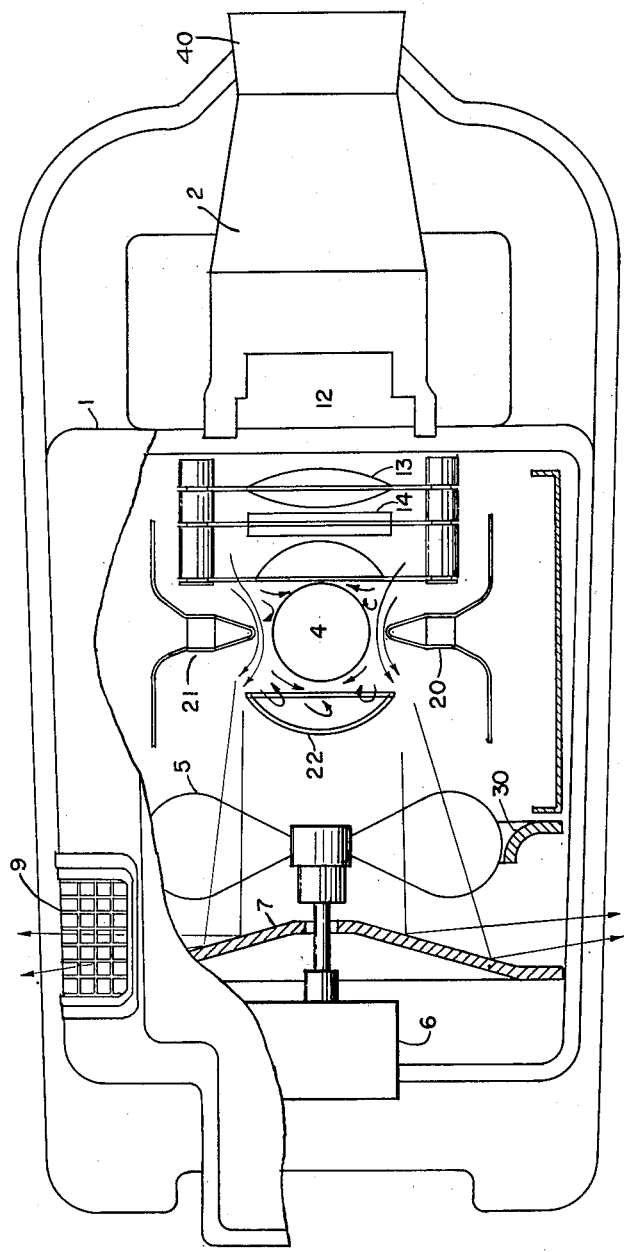

These and other objects of the invention will be apparent from the following specification and drawings, of which Figure 1 is an elevation sectional view of an embodiment of the invention, and Figure 2 is a partial plan sectional view of the embodiment of Figure 1.

Referring now to Figure 1, there is generally shown a film projector having a casing 1 upon which is generally located a nose portion 2, containing the focusing lenses 40. Condensing lenses 41 and heat filters are located in the forward portion 3, the projector lamp 4 located behind the lenses, and a fan 5 and motor 6 is located in the rear of the casing. A novel cone 7 is located between the fan and the motor. The purpose of the cone 7 is to deflect the air out the grating 9 in the side of the projector as shown by the arrows, as will be more fully discussed. The paths of the air currents are indicated by the arrows.

The invention can best be described by showing the air flow past the various members. The air is generally drawn from the forward lower portion of the projector up through the lower portion 10 of the casing which is apertured to permit entry of the air. A current of air flows, as shown by the arrow A, up through the inner casing 11 around the front face of the film, which is located in the area 12, and around clockwise and down around the casing 11. Air is also drawn up through the chimney 12' and around the lens 13 and heat filter 14 and then is drawn back towards the fan and around the projector lamp 4. The flow of the air around the projector lamp 4 will be more fully described in connection with Figure 2. Air is also drawn in from the top forward portion of the projector shown by the arrow B, behind the film mounting space 43, around the lenses 13 and heat filter 14 and then back around the upper portion of the projector lamp 4. The lens mountings may be spiders or equivalent open construction to permit free passage of the air.

Referring now to Figure 2, a pair of longitudinal air director members 20 and 21 are located beside the projector lamp and extends substantially the full length of the projector lamp, which is a long, narrow cylinder. The spacing between the director members 20 and 21 and the projector lamp is quite small so that these two directors have a Venturi effect, greatly increases the velocity and turbulence of the cooling air around the surface of the projector lamp 4.

The projector lamp is a long, cylindrical object and in the presence of normal cooling air currents, air bubbles form on the outside surface of the lamp, forming stagnant air pockets which insulate the outer surface of the lamp from the cooling air. By greatly increasing the velocity and turbulence of the cooling air with the present invention, it is possible to wash these pockets off the surface of the cylindrical object, thereby removing the insulation of the air pockets and providing a much greater cooling effect. This turbulence is one of the important features of the present construction, since the greatly increased velocity of the air on all sides of the projector lamp creates a great deal of turbulence between the projector lamp, the reflector 22, and the lens immediately in front of the projector lamp, thereby knocking or washing the air pockets off the lamp.

The most important part of the projector to cool is the surface area of the projector lamp. In large size projectors these lamps are generally rated at 500 and 1000 watts. Due to the small surface area of these lamps, and the necessarily restricted space inside the projector, the heat generated at the surface of these lamps is tremendous. This is further compounded by the fact that all of the heat and light energy is not dissipated in different directions, but a great portion of it is reflected by reflector 22 located at the rear of the projector lamp, which reflects all of this energy back through the lamp and into the light path through the film in order to project the image. Due to the fact that such tremendous heat is generated in this lamp, certain chemical changes take place inside the lamp which weaken the parts which are necessarily very delicate to begin with, and this greatly decreases the rated life of these lamps. Since these lamps are very expensive, the rated life is of considerable importance. It is interesting to note in this connection that in very large projectors of the type used in movie theaters, the power requirements are so great that projector lamps cannot be manufactured with enough power in a sufficiently small space, so that projectors in movie theaters generally do not use lamps, but use carbon arcs. This is an indication that there is a very real cooling problem, since the carbon arcs require considerable adjustment and maintainance and could not compete with lamps if the lamps could be manufactured to do the job.

The life and efficiency of the lamps can be greatly increased by forcing more cooling air past them. However, the design factors limit the amount of cooling air that can be forced past the lamps, for instance, the fan and motors are restricted to a fairly convenient size for portable projectors, and in order to do an optimum job the fan and motor will have to be ridiculously large in comparison to the rest of the apparatus. Furthermore, the fan motors are quite heavy and this cannot be tolerated at a portable piece of equipment.

There is also a safety factor involved, since these lamps are liable to get so hot they will explode. Although if they do not explode, the glass envelope is liable to melt and expand and the lamp cannot be removed from the projector without breaking it.

The present arrangement of cooling the lamp and lenses has been found to markedly increase the efficiency and life of the lamps and also reduces the temperature of the surface of the projector.

After the air has been drawn past the lamps between fan 5, it is driven through the fan onto the cone member 7, and thence deflected at an angle at 90° out the sides and/or bottom of the projector through the grill work 23, the motor 6 being located behind the cone. The use of this cone 7 has been found to greatly increase the rated feet per minute of the fan. The reason for this phenomenon is not fully understood by the applicant and is not the result expected from theoretical aero dynamic considerations. However, it is known that aero dynamic theory does not apply too well to small air movements, such as being discussed here. It appears that the cone has some accelerating effect upon the air flow despite the fact that the air flow is deflected almost 90°. There is a bell mouth 30 around the outside of the fan to prevent recirculation of hot air, and tends to increase the air pressure and velocity of flow.

The essential features of the present invention are believed to reside in the chimney which circulates the air around both sides of the film between the lenses and air filters, in the longitudinal Venturi construction which guides the flow of air past the lamp and in the cone construction associated with the fan. It is preferable that all the internal compartments and parts inside the projector be apertured to facilitate the passage of the cooling air with the exception of the Venturi directors 20 and 21, which are designed to force the air to pass closely along the surface of the lamp at a greatly increased velocity. The construction of the fins 20 and 21 is such as to provide a uniform form of cooling effect which relieves stress and strains in the lamp envelope.

I claim:

1. Cooling means for film projectors of the type having means for mounting the condenser and projection lenses, a projector lamp, a fan and motor, comprising a first chimney means located in the lower front portion of said casing underneath said lenses, a pair of longitudinal air directors having generally V-shaped cross-sections located on either side of said projector lamp to give a longitudinal restricted air-channel means, said lamp being located behind said lenses and between the apexes of said V-shaped directors, a motor-driven fan located behind said lamp and a deflecting member located behind said fan, whereby air is drawn up through said chimney around said lenses around said projector lamp at a greatly increased velocity through said fan against said cone and out the rear side and bottom of said projector casing.

2. Apparatus as in claim 1, wherein said air directors are designed and dimensioned to provide a longitudinal Venturi air channel effect, thereby greatly increasing the velocity and turbulence of air flow past the surface of said projector lamp.

3. Film projector means comprising a projector casing, a lens system mounted in the front portion of said projector, a light source located behind said lens system, a pair of air director means located on each side of said light source and having minimum cross-section in the plane of said source to give a longitudinal restricted air-channel means to greatly increase the velocity and turbulence of cooling air around said light source, a motor-driven fan located behind said lamp and means located behind said fan and adapted to deflect the cooling air substantially 90° outside the casing of said projector.

4. Apparatus as in claim 3, wherein said air director means adjacent said lamp extend the full length of said lamp and are dimensioned and positioned to provide a longitudinal Venturi air channel effect, thereby greatly increasing the velocity and turbulence of cooling air past said lamp.

5. Means for cooling a film projector lamp, comprising a pair of air director means located on each side of said lamp at a slight spacing from said lamp and having minimum spacing between themselves adjacent said lamp, said directors being arranged to form in combination with said lamp, a longitudinal Venturi air channel opening, thereby greatly increasing the velocity and turbulence of cooling air past said lamp.

6. Means for cooling a film projector lamp, comprising a pair of air directors located adjacent said lamp at a slight spacing from said lamp, said air directors being arranged to form a longitudinal Venturi air channel opening having a minimum spacing adjacent said lamp, thereby greatly increasing the velocity of cooling air past said lamp, a motor driven fan located behind said lamp and a deflector located behind said fan adapted to deflect the air out said projector casing.

References Cited in the file of this patent

UNITED STATES PATENTS

| | | |
|---|---|---|
| 1,966,531 | Tint | July 17, 1934 |
| 1,971,454 | Loomis | Aug. 28, 1934 |
| 2,344,263 | Perkins | Mar. 14, 1944 |
| 2,362,601 | Wengel | Nov. 14, 1944 |
| 2,449,713 | Nemeth | Sept. 21, 1948 |
| 2,564,057 | Fitzgerald | Aug. 14, 1951 |
| 2,568,895 | McMaster et al. | Sept. 25, 1951 |